| United States Patent [19] | [11] Patent Number: 4,888,854 |
| Russell et al. | [45] Date of Patent: Dec. 26, 1989 |

[54] FOLDING SEAT HINGE ASSEMBLY WITH QUICK DISCONNECT

[75] Inventors: Ronald W. Russell, Utica; Larry R. Cox, Brownstown, both of Mich.

[73] Assignee: Chrysler Motors Corporation, Highland Park, Mich.

[21] Appl. No.: 339,537

[22] Filed: Apr. 17, 1989

[51] Int. Cl.$^4$ .............................................. E05D 7/10
[52] U.S. Cl. ........................................ 16/266; 16/260; 16/267; 16/341; 296/65.1; 297/379
[58] Field of Search ................ 16/267, 260, 266, 341, 16/356, 262; 296/65.1; 297/379

[56] References Cited

U.S. PATENT DOCUMENTS

| 1,717,336 | 6/1929 | Grimm | 296/64 |
| 2,302,661 | 11/1942 | Benson | 16/267 |
| 3,328,069 | 6/1967 | Dumas | 296/65.1 |
| 3,550,949 | 12/1970 | Bonnaud | 296/69 |
| 3,807,790 | 4/1974 | Erard | 296/66 |
| 4,191,417 | 3/1980 | Ferrara | 296/65.1 |
| 4,475,763 | 10/1984 | Hamatani et al. | 295/65.1 |
| 4,475,769 | 10/1984 | Crawford et al. | 297/331 |
| 4,484,776 | 11/1984 | Gokimoto et al. | 296/65.1 |
| 4,512,609 | 4/1985 | Paarsson | 297/331 |
| 4,606,577 | 8/1986 | Hirama et al. | 297/331 |
| 4,629,252 | 12/1986 | Myers et al. | 297/379 |

FOREIGN PATENT DOCUMENTS

| 2628726 | 1/1978 | Fed. Rep. of Germany | 16/266 |
| 1469438 | 3/1974 | United Kingdom | 16/266 |

Primary Examiner—Richard K. Seidel
Assistant Examiner—James Miner
Attorney, Agent, or Firm—Edward P. Barthel

[57] ABSTRACT

A pair of separable hinge assemblies mount a seat cushion on a vehicle for positioning between a normal seating mode and a folded stored mode. The hinge assemblies each comprise a body-half hinge plate mounted to the vehicle body and a seat-half hinge plate mounted to the seat cushion hardened undersurface. The body-half plate has upstanding side webs each formed with open end mirror image slots adapted to releasably capture a pintle pin extending transversely between parallel ear portions of the seat-half hinge plate. Each ear portion includes mirror image first and second cam shoulders adapted to frictionally retain the hinge assemblies in their respective normal or folded modes. Upon pivoting the seat cushion to an intermediate position both sets of cam shoulders of each seat-half hinge plate are spaced from their associated body-half plate camming surfaces allowing the separation of the hinge assemblies and removal of the seat cushion.

7 Claims, 4 Drawing Sheets

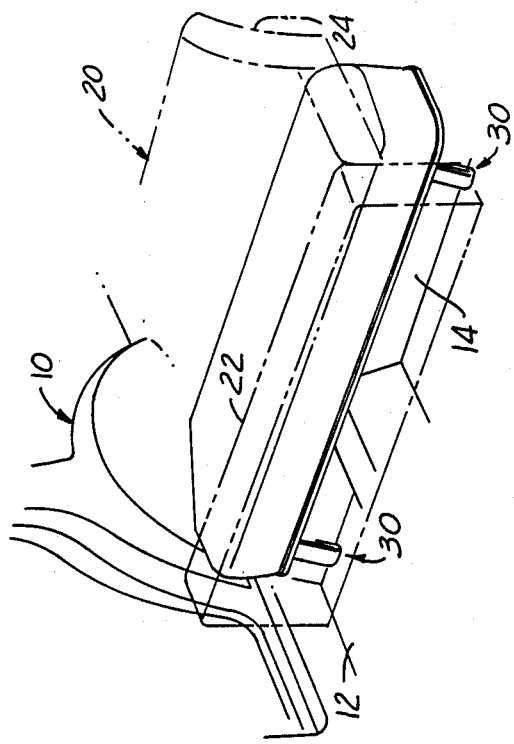
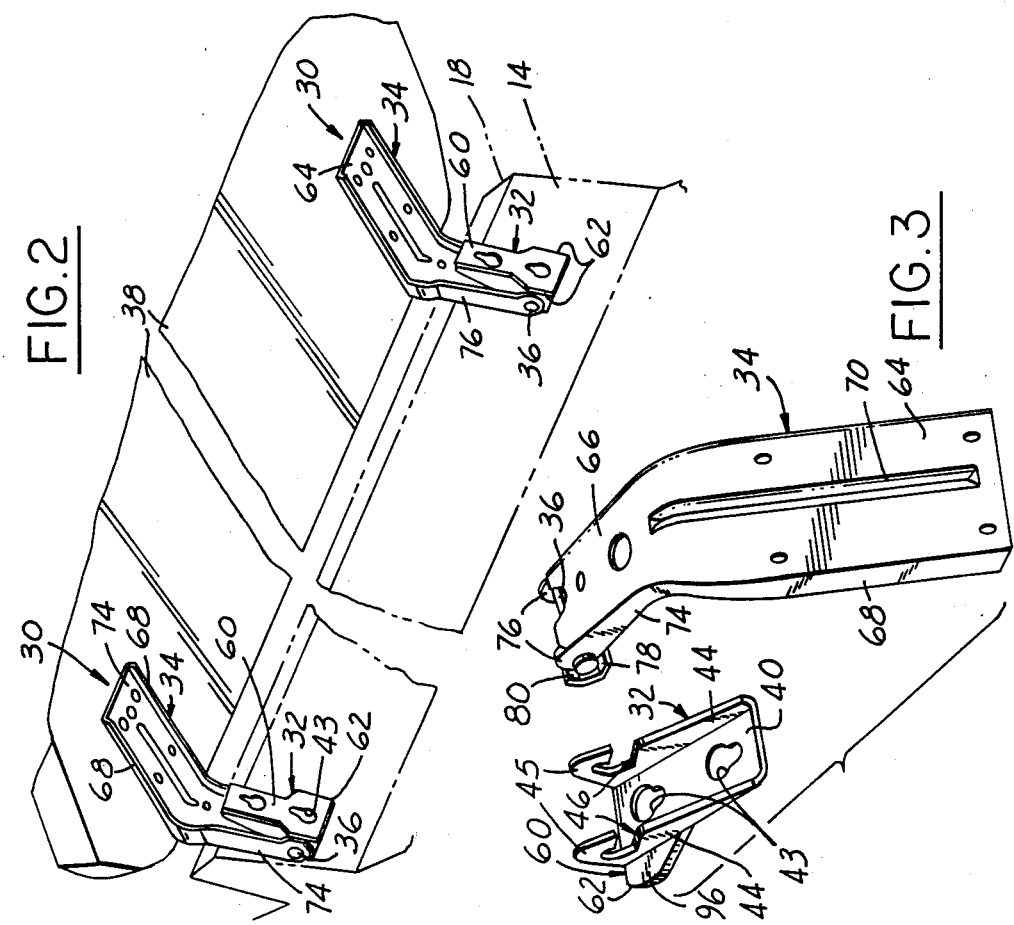

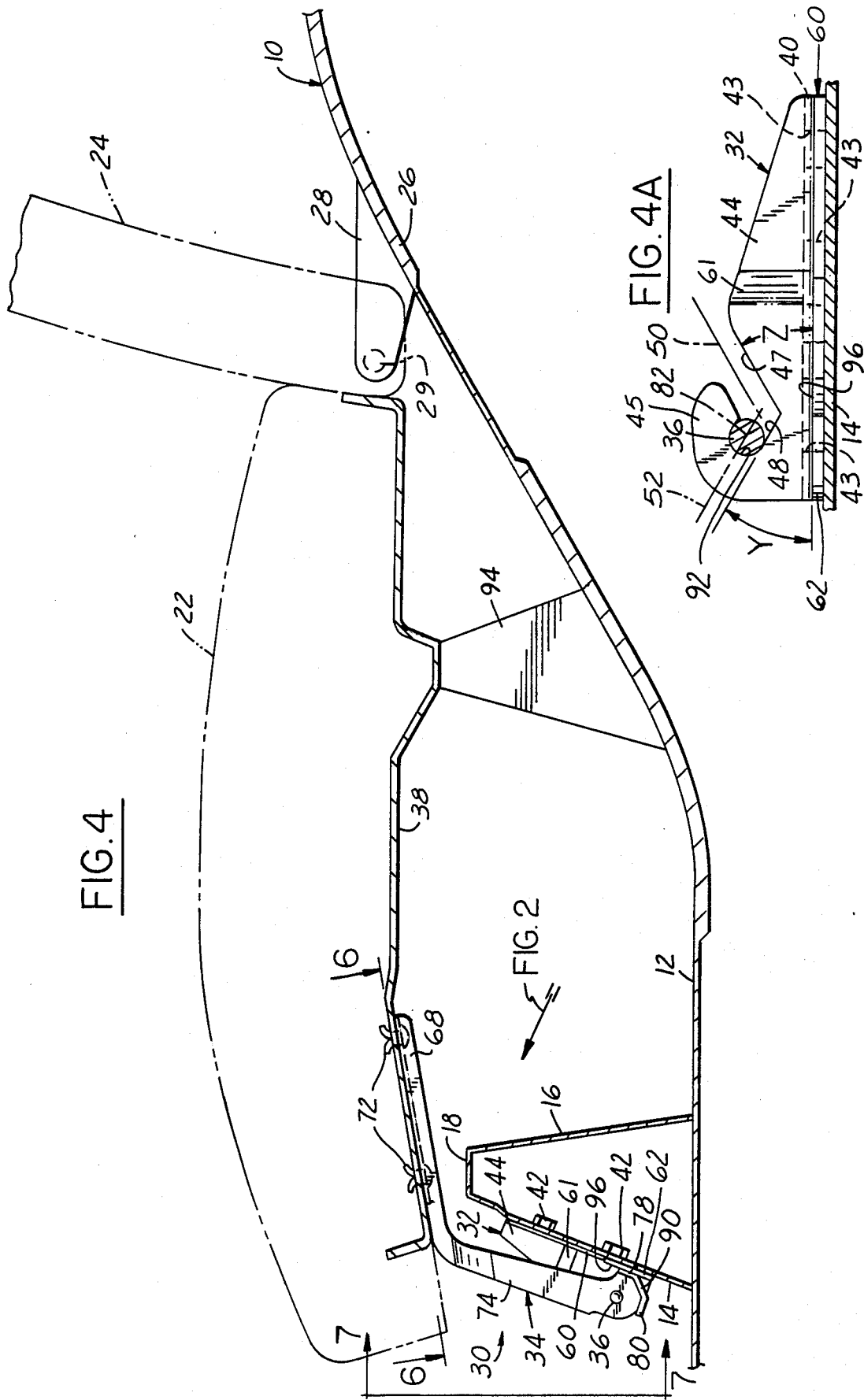

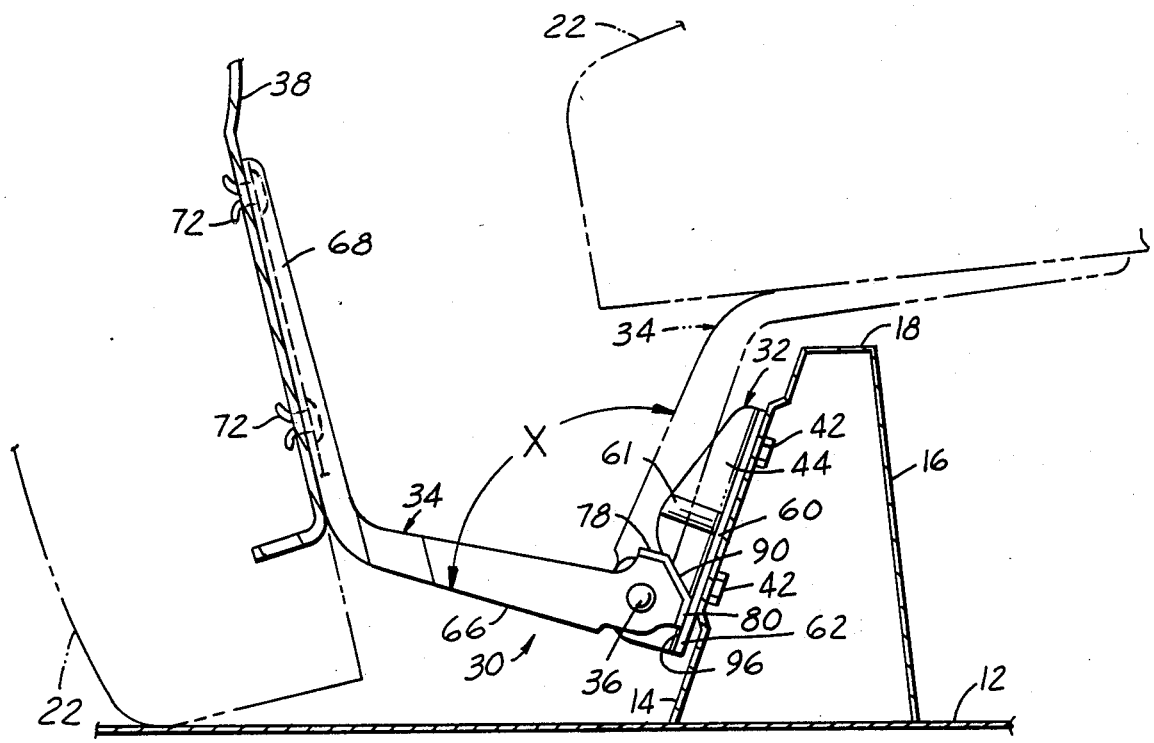
FIG. 5
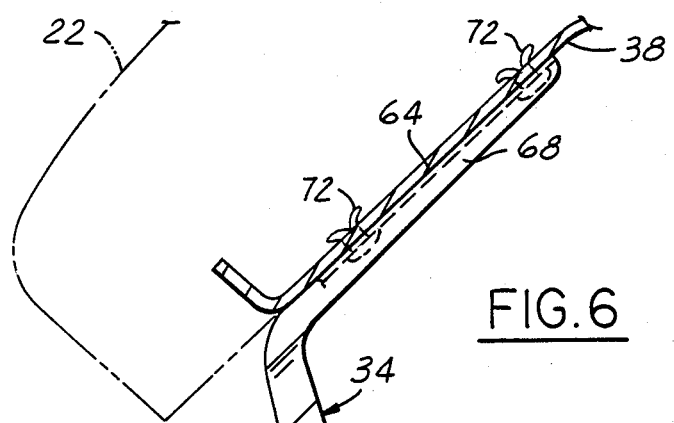
FIG. 6
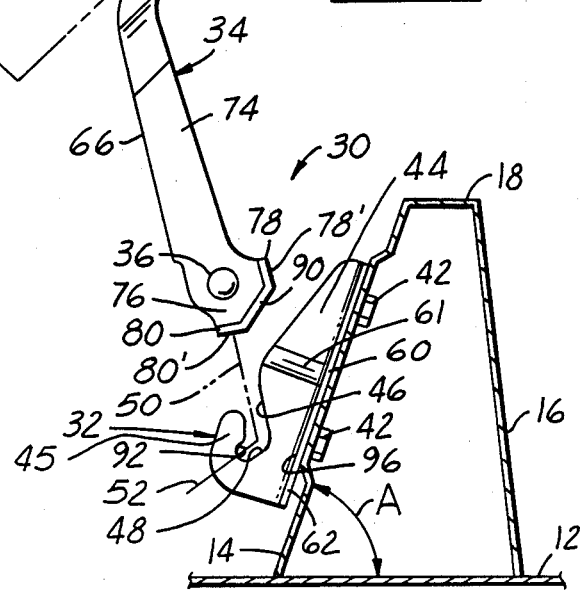
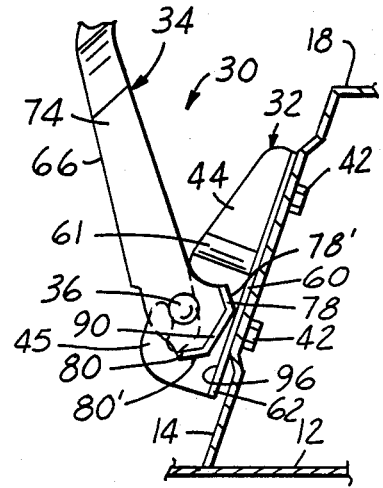
FIG. 6A

FOLDING SEAT HINGE ASSEMBLY WITH QUICK DISCONNECT

BACKGROUND OF THE INVENTION

This invention relates to automotive vehicle seat construction and more particularly to a separable hinge assembly for a folding seat cushion enabling the seat cushion to be readily removed from the vehicle when the cushion is pivoted to an intermediate position between a normal seating position and a forwardly folded stowed position.

The use of automobile seats which are convertible to a folded stowable position is well known in the design of vehicles such as vans, sport utility trucks, station wagons and the like to provide increased riding or cargo space. An example of one such arrangement is disclosed in U.S. Pat. No. 4,512,609 issued Apr. 23, 1985 to Parsson which shows means for rearranging a back seat cushion in a passenger car. The Parsson seat cushion is articulately connected via an L-shaped link to the vehicle body for arrangement between a normal sitting position and a retracted substantially vertical loading position.

The U.S. Pat. No. 4,606,577 issued Aug. 19, 1986 to Hirama et al. discloses an automotive folding seat adapted to be retracted to provide a wider entrance space for passengers. The seat back can be folded onto a seat cushion and the seat in its entirety can be pivoted to a retracted position wherein the seat cushion is aligned vertically with the seat back folded onto the seat cushion.

The U.S. Pat. No. 4,700,989 issued Oct. 20, 1987 to Ercilla discloses a foldable vehicle seat which is also removable. The seat structure comprises front legs and rear legs, each of the legs including a fork member and arranged to cooperate with a fixed attachment rod of a frame. A movable lock member is provided on each leg for locking a leg on its corresponding attachment rod. Return biasing means urge each of the lock members into its locked position. Manually operated means actuate each of the lock members into its unlocked position, against the return biasing means, to release the seat legs from the corresponding attachment rods.

SUMMARY OF THE INVENTION

One of the major problems of prior art vehicle removable seats, as seen in the Ercilla patent, require hinge assemblies with movable lock members that must be manually unlocked before the seat can be removed from the vehicle. It is an object of the present invention to provide a separable hinge assembly for a vehicle foldable seat member which allows removal of the seat member without requiring the operator to manually disengage the hinge assemblies.

A separable seat hinge assembly is disclosed comprising a body mounting or body-half hinge plate and a seat cushion mounting or seat-half hinge plate. The body mounting plate is formed with a channel-shaped cross-section having a base portion fixed to a rearwardly sloped footwall section of the vehicle floor pan. Side webs extend from the body-half plate base portion and have mirror image generally V-shaped slots with each slot including an angled open-end slot portion and an angled blind-end slot portion.

The seat-half hinge plate comprises a tongue portion, fixed to the hardened undersurface of the seat cushion front end section, and a cantilevered neck portion extending downwardly and forwardly at an obtuse angle from the tongue portion. The neck portion is formed with a U-shaped cross-section defining a bight section having parallel side flanges. The side flanges terminate at their lower free ends in a pair of ears fixedly supporting a transverse pintle pin therebetween. Formed on the ears are mirror image outboard directed dual locking cam sectors. Each cam sector is disposed in an imaginary arc of a circle, having its center on the pintle pin axis, and comprises an intermediate chordal portion terminating at its free ends in first and second sets of tangent cam shoulders defining a substantially ninety degree central angle of the arc. A wing portion projects laterally from each side of the body-half plate providing a planer camming surface adapted for engagement by its associated seat-half first and second cam shoulders. With the seat cushion located in its normal mode each seat-half plate pintle pin is captured in the blind-end slot portions of its associated body-half plate such that the first set of cam shoulders are in flush frictional engagement with their associated wing camming surface. Upon the seat cushion being rotated forward about the pintle pins to its overcenter folded mode each first set of cam shoulders are unlocked and each second pair of cam shoulders are pivoted into flush frictional engagement with their associated wing camming surface.

To remove the seat cushion it is only necessary to pull a side loop on the cushion and pivot the seat cushion forward from its normal seating mode to a predetermined intermediate release position adapted for upward lift-off removal. After swinging the seat cushion to its intermediate position about the pintle pins each hinge assembly seat-half plate first and second sets of cam shoulders are located in spaced relation to their associated body-half plate camming surfaces. The operator then pulls the seat cushion rearwardly whereby the pintle pins are moved out of their blind-end slot portions into their upwardly directed open-end slot portions and lifts the seat cushion upwardly freeing the seat-half hinge plates from their associated body-half hinge plates enabling ready removal of the seat cushion from the vehicle.

BRIEF DESCRIPTION OF THE DRAWING

Other objects, features, and advantages of the present invention will become apparent to those skilled in the vehicle seating art are readily apparent from the following detailed description of the best mode taken in conjunction with the accompanying drawings in which:

FIG. 1 is a fragmentary perspective view, with parts cut away, of a vehicle having a rear seat including a forwardly foldable seat cushion secured by a pair of separable hinge assemblies according to this invention;

FIG. 2 is a fragmentary perspective view, with parts broken away, taken in the direction of the "FIG. 2" arrow in FIG. 4 showing pair of the separable hinge assemblies;

FIG. 3 is an enlarged, exploded, perspective view of a separable hinge assembly;

FIG. 3A is an enlarged detail top elevational view of the body-half plate of the separable hinge assembly;

FIG. 4 is an enlarged fragmentary side elevational view, partly in section, of the seat cushion in its normal seating mode showing one separable hinge assembly:

FIG. 4A is an enlarged side elevational detail view of the body-half hinge plate of FIG. 4 together with its pintle pin;

FIG. 5 is a view similar to FIG. 4 with a seat cushion separable hinge assembly pivoted from its dashed-line normal mode to its forwardly folded full-line storage mode;

FIG. 6 is a view of the seat cushion and the hinge assembly subsequent to their being folded to a predetermined intermediate disconnect position showing the seat cushion and one seat-half hinge plate separated from its body-half plate;

FIG. 6A is a view showing the separable hinge assembly pivoted to its intermediate disconnect position;

DETAILED DESCRIPTION OF THE INVENTION

Figure 7:
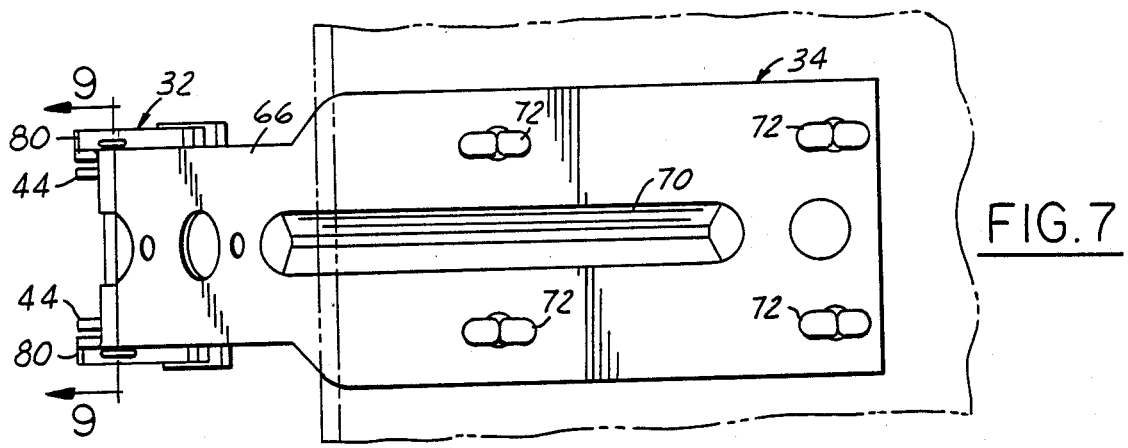
FIG. 7 is an enlarged detail top view of a hinge assembly in its normal position.

Referring to FIGS. 1 and 4 of the drawing, a vehicle 10 of the multipurpose type includes a floor pan 12 which has a rear transverse kickup tunnel defined by rearwardly and forwardly sloped or angled footwalls 14 and 16, respectively, and an intermediate horizontal wall 18. A vehicle rear seat 20 includes a seat cushion 22 and a seat back 24 of conventional structure. To expand the cargo area the seat cushion 22 is first pivoted forwardly about separable hinge assemblies to be described. The seat back 24 is next pivoted at its lower edge on the seat support portion 26 by suitable brackets 28 upon release of locks (not shown) at either side of the seat back. The seat back is then swung about pivot pins 29 between its upright position shown in FIG. 4 and a flat position shown in FIG. 1 in which its normally rearwardly facing hardened back provides an extension of the cargo floor.

A pair of leftside and rightside separable hinge assemblies 30, each comprising a body mounting or body-half hinge plate 32 and a seat cushion mounting or seat-half hinge plate 34, pivotally mount the forward section of the seat cushion 22 to the vehicle floor pan 12. The seat cushion 22 is thus movable about hinge pintle pins 36 from its horizontal seating position or normal mode to its forwardly pivoted overcenter storage position or folded mode. It will be noted that the normally downwardly facing hardened underpanel 38 of the seat cushion 22 acts as a cargo barrier in its rearwardly facing folded position best seen in FIG. 5.

With reference to FIGS. 2 and 3 it will be seen that the pair of hinge assemblies 30 are identical, i. e. non-sided, and thus only the leftside hinge will be described in detail. The body-half plate 32 is formed with a channel-shaped cross section having a planar base portion 40 fixed to the rearwardly sloped footwall portion 14 of the vehicle floor pan 12 by suitable fasteners such as bolts 42. The base portion 40 has a pair of key-hole shaped apertures 43 therein adapted to adjustably receive the pre-assembled bolts 42. FIG. 1 shows a full width rear seat cushion mounted to the vehicle body by a pair of left and right separable hinge assemblies. It will be noted, however, that the seat cushion could be a split-type wherein individual sections of the rear seat cushion could be folded separately to a stored mode. In such an arrangement, of course, duplicate separate pairs of hinge assemblies 30 would be required for each folding seat cushion portion.

In FIG. 3 it will be seen that the body-half hinge plate base portion 40 has a pair of ninety degree extending side webs 44 formed with inwardly angled or crimped symmetrical web offsets 61. The side webs 44, which are generally triangular-shaped in side elevation, terminate in hook shaped portions 45 having a configuration so as to provide a pintle pin follower slot means 46 in the form of mirror image generally V-shaped through slots. As best seen in FIG. 4A each V-shaped slot is defned by an upwardly angled open-end first slot portion 47 and upwardly angled second blind-end slot portion 48. In the preferred embodiment of the invention FIG. 6 shows the body-half plate disposed on the foot-wall 14 sloped rearwardly at an angle "A" of about 70 degrees from the horizontal floor pan 14. It will be seen in FIG. 4A that the open-end slot portion 47 is oriented at an acute angle "Z" of the order of 30 degrees from the base portion 40. Thus, in its mounted position of FIG. 6 the entrance path of the open-end slot portion 47, as shown by dashed centerline 50, is at a combined obtuse angle of about 110 degrees from the horizontal floor pan 12. Further, the blind-end slot portion centerline 52 defines an obtuse included angle of about 120 degrees with the open-end slot portion centerline 50. Consequently the centerline 52 is sloped downwardly and forwardly at an acute angle "Y" of about 30 degrees to the horizontal floor pan 12. The reason for this arrangement of the V-shaped pintle pin follower slots will be apparent from the description below.

As best seen in FIGS. 3 and 3A the body-half hinge plate has a coextensive sub-plate 60 secured, as by spot welds, to the undersurface of the base portion 40. The sub-plate 60 is generally fan-shaped providing mirror image wing portions 62 that project from either side of the body-half plate at its lower or leading end adjacent the V-shaped slots. The upper planar surfaces of the wing portions 62 provide camming areas to be explained.

Figure 10:
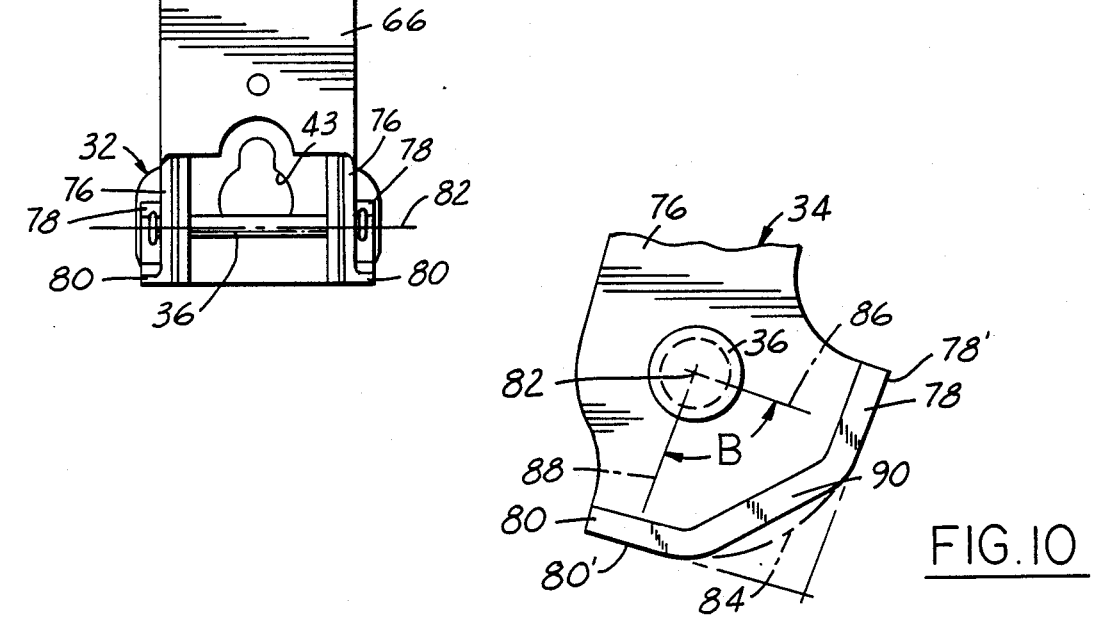
FIG. 10 is an enlarged fragmentary side elevational view of a cam shoulder portion of a hinge seat-half plate.

With reference to FIGS. 2, 3, and 10 the dog-leg shaped seat-half mounting hinge plate 34 is in the form of a planar tongue portion 64 and a narrow neck portion 66. The tongue portion has crimped upright side portions 68 and a central longitudinal rib 70 to add stiffness thereto. Suitable mounting means, such as rivets 72 shown in FIG. 4, secure the tongue portion 64 to a front end section of the seat cushion hardened back 38. The neck portion 66 extends downwardly and forwardly from the tongue portion 64 defining an obtuse angle therebetween of about 120 degrees.

Figures 8, 9:
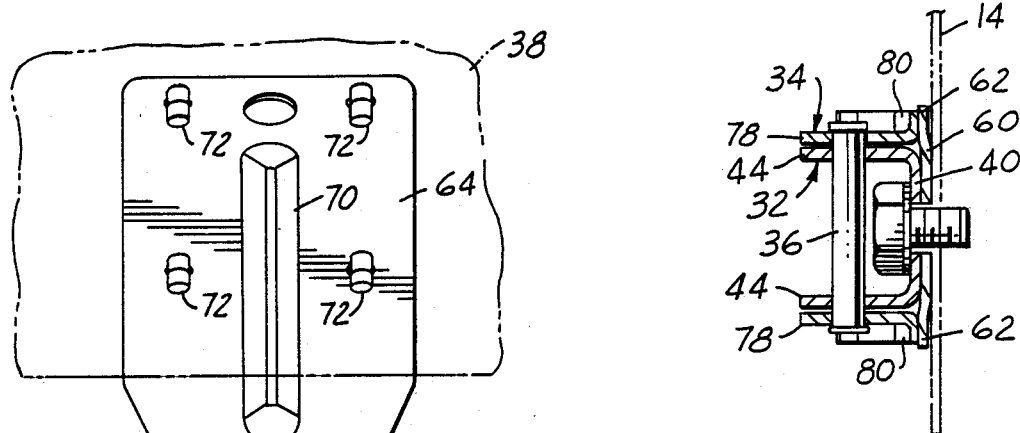
FIG. 8 is an enlarged detail front elevational view of a hinge assembly in its normal position.
FIG. 9 is vertical sectional view, partly in elevation, taken on the line 9—9 of FIG. 7.

The seat-half neck portion 66 is formed with a U-shaped cross section having parallel side flanges 74–74 terminating at their free ends in a pair of inboard and outboard ears 76–76. As seen in FIGS. 8 and 9 the ears 76–76 support the transverse pintle pin 36 therebetween. The ears 76–76 are formed with paired first 78–78 and second 80–80 sets of mirror image cam shoulders. FIG. 8 shows the body-half hinge plate 32 and the seat-half hinge plate 34 in their normal mode with the paired first and second sets of cam shoulders 78–78 and 80–80 respectively, extending in opposite directions parallel to the pintle pin axis 82.

With reference to FIG. 10 it will be seen that each first and second set of cam shoulders 78–78 and 80–80 are disposed tangentially to an imaginary arc 84 of a circle having its center on the pintle pin axis 82. It will be noted that the first 78-78 and second 80-80 tangent cam shoulders have normal radii 86 and 88 respectively, defining a central angle "B" of the order of ninety degrees. In the preferred form of the invention the first 78-78 and second 80-80 sets of cam shoulders are formed integral with an intermediate shoulder portion 90 aligned substantially on a chord of the imaginary arc 84.

In operation the seat cushion 22 is installed, as viewed in FIG. 6, by aligning each pintle pin 36 such that it is received in the upper open end of slot portion 46 for subsequent gravity induced movement into blind-end slot portion 48. As seen in FIG. 4A the slot portion 48 has its blind-end defined by a half-circle 92. The centers of each half-circle 92 establish the hinge axis 82 of the foldable seat cushion. Thus, the paired half-circles 92 of each body-half plate, upon receiving their associated pintle pin 36, locate the pintle pin principal axis on center with the hinge axis 82.

With the seat cushion 22 in its FIG. 4 normal seating mode it will be seen that each first cam shoulder 78 has its cam face 78' (FIG. 10) in flush frictional engagement with an opposed camming surface 96 of its associated wing portion 62. Upon the seat cushion 22 being pivoted to its upright stored or folded mode of FIG. 5 the cam shoulders 78-78 are released and each cam face 80' of the cam shoulders 80-80 is positioned in flush frictional engagement with an associated opposed wing portion camming surface 96. It will thus be noted that each separable hinge assembly 30 has its body-half plate and its seat-half plate held in a positive noise free manner in either its seat cushion normal or folded mode. That is, by having one of the seat-half plate 34 sets of cam shoulders 78—78 or 80—80 in frictional engagement with their associated camming surface 96, the separable hinge plates 32 and 34 are held in a positive manner to obviate movement between the plates 32 and 34 insuring against any rattling noise therebetween.

To remove the seat cushion 22 the operator first swings the seat cushion to a predetermined intermediate position, shown in FIG. 6A, wherein the first and second sets of shoulder cam faces 78'-78' and 80'-80' are in their non-engaged mode, i.e. spaced from their associated wing camming surfaces 96. The operator next lifts upwardly and rearwardly on the seat cushion 22 causing the pintle pins 36 to slide out of their associated blind-end slot portions 48 for upward travel from the open end slot portions 47. With the hinge plates 32 and 34 separated the seat cushion may be removed from the vehicle.

While the invention has been described with reference to a particular embodiment thereof, it will be apparent that various changes may be made therein without departing from the spirit and scope of the invention and it is intended by the appended claims to cover all such modifications as fall within the true spirit and scope of the invention.

What is claimed is:

1. A separable seat hinge assembly for supporting a seat member in a vehicle body for movement about a hinge pivot axis, said separable hinge assembly comprising:

a seat-half plate secured to the seat member, said seat half-plate having a pair of parallel spaced ears supporting a pintle pin therebetween;
a body-half plate secured to the vehicle body having a pair of parallel webs, each said web provided with pintle pin follower slot means formed in mirror image relation, said pintle pin being received in each said slot means such that it is aligned on the hinge axis, said body-half plate formed with a pair of laterally extending mirror image wing portions providing a pair of camming surfaces;
said seat-half plate ears formed with mirror image first and second sets of arcuately spaced cam shoulders with each said first and second set of cam shoulders extending in opposite directions parallel to the hinge axis;
whereby with said seat member in its seating mode each said first set of cam shoulders disposed in frictional engagement with their associated camming surfaces, and whereby with said seat member pivoted on said pintle pin about said hinge axis to its folded mode said second set of cam shoulders disposed in frictional engagement with their associated camming surfaces; and
whereby upon said seat cushion being pivoted about the hinge axis from either its seating mode or its folded mode to a predetermined intermediate detachable mode such that both said first and second sets of cam shoulders being in spaced relationship to their associated camming surfaces enabling said seat-half hinge plate pintle pin to exit said slot means and the seat member to be lifted off its associated body-half hinge plate.

2. The separable hinge assembly as set forth in claim 1, wherein each said first and second set of cam shoulders are disposed arcuately around the pintle pin axis centerline.

3. The separable hinge assembly as set forth in claim 2, wherein each said set of first and second cam shoulders defining a central included angle of said imaginary circle of the order of ninety degrees.

4. The separable hinge assembly as set forth in claim 1, wherein said body half-plate formed with a generally channel-shaped cross section defining a base portion and a pair of raised webs.

5. The separable hinge assembly as set forth in claim 4, wherein said cam slot means in the form of mirror image generally V-shaped through slots, each said V-shaped slot defined by an angled open-end slot portion oriented at a first acute angle from said base portion, and an angled blind-end slot portion oriented at a second acute angle from said base portion.

6. The separable hinge assembly as set forth in claim 5, wherein said first and second acute angles are each of the order of thirty degrees.

7. A separable seat hinge assembly for supporting a seat cushion in a vehicle body for movement about a hinge pivot axis, said separable hinge assembly comprising:

a seat-half plate secured to the seat cushion, said seat half-plate having a pair of parallel spaced ears supporting a transversely extending pintle pin therebetween;
a body-half plate formed with a generally channel-shaped cross section defining a base portion secured to the vehicle body and a pair of raised webs each formed with mirror image slot means, each said slot means in the form of a V-shaped slot having an open-end slot portion and a blind-end slot portion, each said open-end slot portion receiving said pintle pin therein for movement into each said blind-end slot portion such that said pintle pin is aligned on the hinge axis, and said body-half plate having a pair of transversely extending mirror image wing portions each defining a camming surface;

said seat-half ears formed with mirror image first and second sets of cam shoulders extending in opposite transverse directions parallel to the principal axis of said pintle pin, each said first and second set of cam shoulders disposed arcuately around the pintle pin axis centerline, whereby with said seat cushion in its seating mode each of said first set of cam shoulders disposed in frictional engagement with an associated camming surface, and with said seat cushion pivoted on said pintle pin about the hinge axis to a folded mode each of said second set of cam shoulders disposed in frictional engagement with an associated camming surface, and whereby upon the seat cushion being pivoted from either its seating mode or its folded mode to a predetermined intermediate detachable mode both said first and second sets of cam shoulders being in spaced relation to their associated wing portion camming surface enabling said seat-half hinge plate pintle pin to exit each said slot means enabling removal of the seat cushion from the vehicle.

* * * * *